Nov. 2, 1943.  C. W. STEWARD  2,333,595
WELDING APPARATUS
Filed Dec. 9, 1941
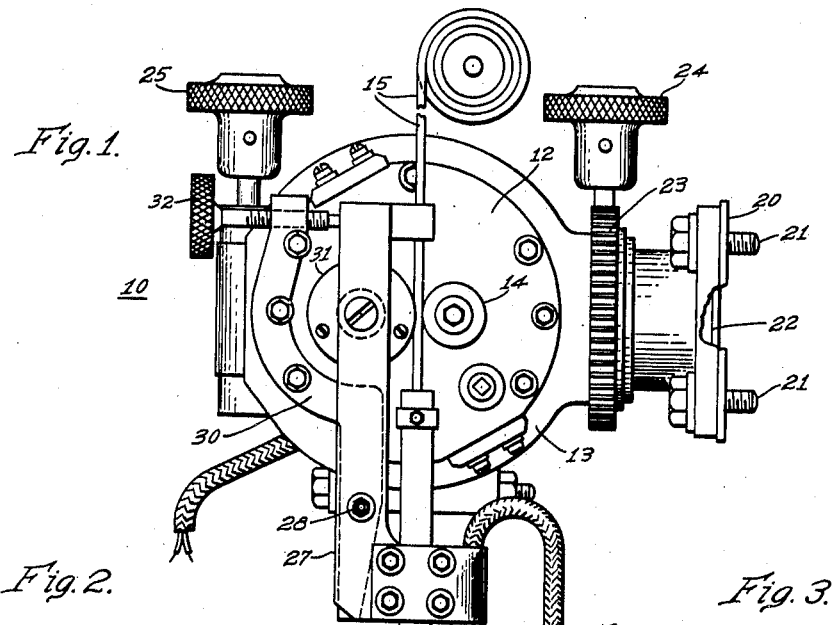
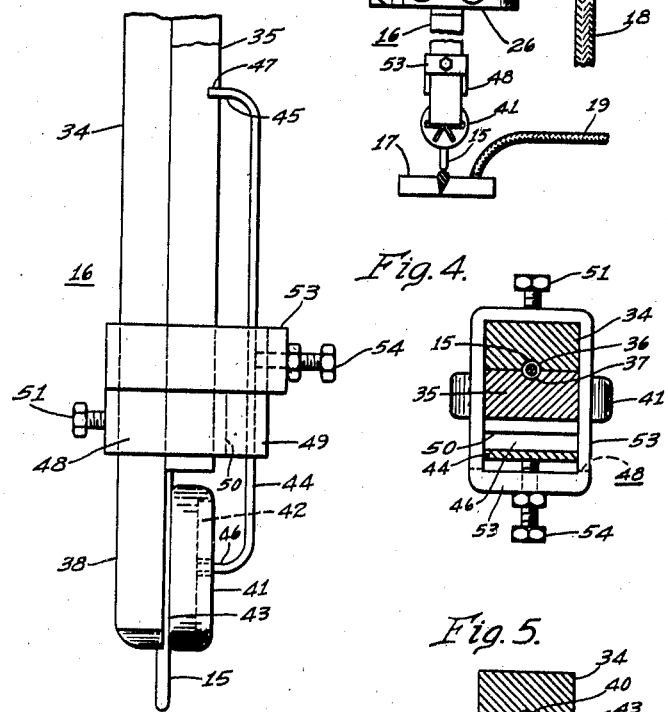
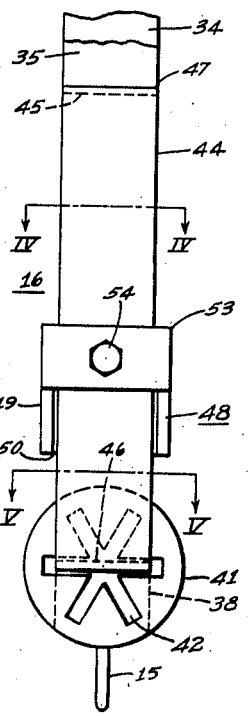
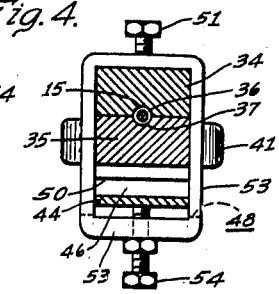
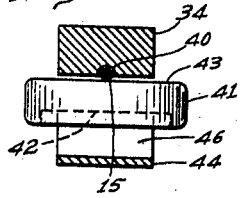
WITNESSES:
C. J. Weller.
F. V. Giolma
INVENTOR
Colby W. Steward.
BY
J. M. Crawford
ATTORNEY Patented Nov. 2, 1943

2,333,595

UNITED STATES PATENT OFFICE 2,333,595

WELDING APPARATUS

Colby W. Steward, West Springfield, Mass., assignor to Westinghouse Electric & Manufacturing Company, East Pittsburgh, Pa., a corporation of Pennsylvania Application December 9, 1941, Serial No. 422,215

8 Claims. (Cl. 314—129)

My invention relates generally to welding apparatus, and it has reference in particular to a nozzle for automatic or semi-automatic arc welding apparatus.

Generally stated, it is an object of my invention to provide a nozzle for automatic or semiautomatic arc welding apparatus which will be efficient to operate and simple and inexpensive to manufacture.

More specifically, it is an object of my invention to provide a nozzle wherein the welding electrode is relatively loosely engaged throughout a substantial portion of the length of the nozzle, and current conducting contact between the welding electrode and the nozzle is provided with only a limited portion of the nozzle.

Another object of the invention is to provide an easily removable pressure contact member for an automatic arc welding nozzle.

It is also an object of the invention to provide an adjustable self-alining pressure contact member for an electrode nozzle.

Yet another object of the invention is to provide a nozzle having a relatively long guide portion loosely engaging the electrode and a relatively short contact portion with a yieldable pressure contact member associated therewith for providing a predetermined current conducting contact between the electrode and the nozzle.

Still another object of the invention is to provide for securing substantially uniform contact with a welding electrode by utilizing a nozzle having a relatively flat pressure contact member to bias the electrode against a current conducting surface and compensate for wear thereof.

Yet another object of the invention is to utilize a pressure contact member in a current conducting nozzle which may be adjusted to present a plurality of different wear surfaces for engaging the electrode.

It is also an object of the invention to utilize an electrode pressure contact member having a plurality of angularly related slots on the side opposite the surface engaging the electrode for positioning the pressure contact member in a plurality of electrode engaging positions.

Other objects may in part be obvious, and may in part be described hereinafter.

In accordance with one embodiment of my invention the nozzle comprises a pair of elongated metallic guide members having opposed grooves defining a bore therebetween of substantially larger cross-section than the electrode. One of the guide members projects longitudinally beyond the other for a predetermined distance and is provided with a hardened wear surface for engaging the welding electrode. A relatively flat pressure contact member is provided, having a hardened wear surface for engaging the electrode to press it against the projecting portion. The contact member is retained in operating relation with the guide members by means of a resilient support member. A plurality of angularly related slots in the back of the contact member provide for effecting connection to the support member, whereby the contact member may be turned to different positions relative to the support member, so as to present different wear surfaces for engaging the welding electrode.

For a more complete understanding of the nature and scope of my invention, reference may be had to the following description which may be read in connection with the accompanying drawing in which:

Figure 1 is a front elevational view of an automatic arc welding head embodying the principal features of the invention;

Fig. 2 is an enlarged partial side elevational view of the nozzle shown in Fig. 1;

Fig. 3 is an enlarged partial front elevational view of a nozzle shown in Fig. 1;

Fig. 4 is a cross sectional view taken along the line IV—IV of Fig. 3; and

Fig. 5 is a cross sectional view taken along the line of V—V of Fig. 3.

Referring to Fig. 1 the reference numeral 10 may denote, generally, an automatic arc welding head comprising, a rotatable frame member 12 supported in a tilting ring 13 and provided with a suitably driven feed roll 14 for engaging an arc welding electrode 15 to feed it through a suitable nozzle denoted generally by the numeral 16, to provide for maintaining an arc with the work 17 upon which a welding operation is to be performed. Cables 18 and 19 provide for conducting current to and from the nozzle and work.

The tilting ring 13 may be rotatably mounted on a support member 20 provided with bolts 21 for securing it to a stationary or moving support as desired. The tilting ring 13 may be provided with a projecting shaft portion 22 suitably journalled in the support 20. The support may be provided with a ring having worm gear teeth 23 about the periphery and a hand wheel 24 suitably secured to the tilting ring and provided with a worm gear (not shown) engaging the worm gear teeth 23, may be utilized for rotating the tilting ring in the support.

The rotatable frame 12 may be rotatably mounted in the tilting ring 13, so as to rotate about an axis perpendicular to the axis of the shaft 22 of the tilting ring. Movement of the rotatable frame relative to the tilting ring may be controlled by means of a hand wheel 25 provided with a worm for engaging worm gear teeth on the rotatable frame in a manner similar to the hand wheel 24.

The nozzle 16 may be supported in any suitable manner, being, for example, secured by means of a clamp member 26 to a guide arm 27, which may be pivotally mounted on the rotatable frame 12 by means of a pivot bolt 28, which pivotally connects the guide arm to a bracket 30 on the rotatable frame. An idler roll 31 may be rotatably mounted on the guide arm 27 adjacent the feed roll 14 for urging the welding electrode wire 15 against the feed roll. Suitable means may be provided for adjusting the pressure between the idler roll and feed roll such as, for example, the adjusting screw 32, which may be threadably mounted on the bracket 30 so as to move the guide arm 27 and the idler roll 31 relative to the feed roll 14.

Referring particularly to Figs. 2 through 5, it will be apparent that the nozzle 16 may comprise a pair of guide members or elongated metal bars 34 and 35, having oppositely positioned longitudinal grooves 36 and 37 which define a bore or aperture for receiving the welding electrode 15. The bars 34 and 35 may be of copper, copper alloy, or of steel. The grooves 36 and 37 are preferably of such dimensions that the bore or aperture defined thereby is considerably larger than the welding electrode 15 throughout the length of the aperture. Accordingly, the welding electrode wire is relatively loosely positioned in the bore or aperture which extends throughout a principal portion of the nozzle, so that particles of matter such as dirt, flux, etc. are prevented from jamming the electrode in the opening and are carried through and out of the opening, and substantially no current is conducted to the welding electrode throughout a principal portion of the length of the nozzle 16.

In order to provide a substantially constant resistance contact between the welding electrode 15 and the nozzle 16, a portion on one of the metal bars may be removed, leaving, for example, a longitudinally extending end portion 38 on the bar 34. The groove 36 in this portion may be made to provide a relatively close fit with the welding electrode 15, and may be provided with a hardened wear surface by means of a wear insert 40 of Stellite, Dymonhard, beryllium copper or any other material having good wearing properties.

Means may be provided for urging the electrode 15 into engagement with the extending end portion 38 of the bar 34 such as, for example, the pressure contact member 41. The pressure contact member may, for example, comprise a relatively flat disc of a wear resisting metal such as tool steel, beryllium copper or an equivalent, and may be provided with a plurality of angularly related slots 42 in the side opposite the wear surface 43 which engages the welding electrode 15.

Suitable means may be provided for positioning the pressure contact member 41 in predetermined longitudinal position relative to the bar 35, and to maintain a predetermined contact pressure between the contact member and the welding electrode. In this instance, a relatively flat spring support member 44 is utilized, having angularly related end portions 45 and 46, which may be bent inwardly and positioned, respectively, in a slot 47 in the metal bar 35 and in any one of the slots 42 in the pressure contact member 40. The pressure contact member is thereby made self-alining, as it may rock on the end portion 46 to accommodate irregularities in the electrode 15. Adjustment for wear of the groove 39 is made automatically, as the pressure contact member 41 is resiliently biased against the electrode and maintains predetermined contact therewith.

The bars 34 and 35 may be clamped together by suitable clamp means such as, for example, the substantially U-shaped rectangular clamp member 48 with upstanding side portions 49 for alining the spring support member and an intermediate connecting portion 50 to engage the bar 35, and a screw 51 for drawing the bars 34 and 35 together.

Suitable means may be provided for positioning the spring member 44 and adjusting it to vary the contact pressure between the pressure contact member 41 and the welding electrode 15. For example, the clip 53 may be utilized which surrounds the bars 34 and 35 and the spring member 44 and rests on the clamp member 48. The clip may be provided with a screw 54 for biasing the spring member 44 toward the bars to increase the contact pressure between the pressure contact member and the welding electrode.

From the above description and the accompanying drawing, it will be apparent that I have provided a welding electrode nozzle which is both efficient to operate and simple and inexpensive to manufacture. By providing a relatively loose fit between the nozzle and the welding electrode throughout a principal portion of the length of the nozzle and concentrating the electrical contact therewith over a relatively short portion of the nozzle adjacent the arc, variations in contact resistances between the welding electrode and the nozzle are minimized. By utilizing a relatively flat pressure contact member which may be readily adjusted to a plurality of different contact positions with the welding electrode, the amount of wear of the contact member may be greatly reduced and the life of the pressure contact member increased. A nozzle embodying the features of my invention is easily adjusted to suit different welding conditions and may be easily disassembled and reassembled for inspection or cleaning purposes and for repairs merely by loosening the screw 54 and sliding the clip 53 upwardly. The spring member and contact member may then be removed leaving the current conducting surface exposed.

Since certain changes may be made in the above description, and different embodiments of the invention may be made without departing from the spirit thereof, it is intended that all the matter contained in the above description and shown in the accompanying drawing shall be considered as illustrative, and not in a limiting sense.

I claim as my invention:

1. An electrode nozzle comprising, a pair of guide members having corresponding longitudinal grooves defining an opening for receiving an electrode, said opening being substantially larger than the electrode throughout the length of the opening to prevent jamming of the electrode in the opening by particles of foreign matter and irregularities of the electrode, one of said guide members extending longitudinally beyond the other, a contact member positioned opposite the extended portion, a relatively flat resilient support member connecting the contact member to one of the guide members having angularly related end portions engaging said members and an intermediate portion spaced therefrom, and means including a substantially closed loop positioned about the guide member and support member and having a set screw to engage one of said members for adjusting the support member to bias the contact member toward the other guide member.

2. A welding nozzle comprising, elongated guide means having a longitudinal aperture to receive a welding electrode with an exposed contact portion adjacent one end, a relatively flat contact member positioned in engagement with the welding electrode to maintain contact therewith throughout the length of the contact portion, a spring connecting the contact member to the guide means, said spring comprising an elongated intermediate portion extending along and in spaced relation to the guide means and inturned end portions engaging the guide means and the contact member, and means for adjusting the spring including a clip at least partially enclosing the guide means and the spring and having a set screw in one side adjustable to vary the distance between the intermediate portion of the spring and the guide means so as to vary the pressure between the contact member and welding electrode.

3. A welding nozzle comprising, elongated guide means having a longitudinal opening for receiving a welding electrode and a relatively open portion on one side to provide access to the welding electrode, a support member associated with the guide means having an angularly related end portion positioned adjacent the said open portion, and a relatively flat contact member positioned in the open portion having a wear surface on one side for engaging the welding electrode and a plurality of angularly related slots on the opposite side for receiving the end portion of the support member to position the contact member in different rotational positions.

4. A contact member for a welding nozzle having a hardened wear surface on one side for engaging a conductor, and a recess on the other side for loosely receiving the end of a support member to permit the contact member to rock thereon.

5. A renewable contact member for a welding nozzle having a relatively flat hardened wear surface on one side for engaging a welding electrode, and a plurality of angularly related diametrical support receiving slots on the other side for positioning the contact member on a support member in different rotational positions.

6. A contact member for a current conducting nozzle comprising, a disc of a relatively hard material having a relatively flat wear surface on one side for engaging a conductor throughout a predetermined length thereof and a plurality of angularly related slots on the opposite side cooperative with a support to permit rotation of the member to different positions with different portions of the wear surface engaging the conductor.

7. A welding nozzle comprising, a pair of elongated metal bars having oppositely positioned longitudinal grooves therein defining an aperture for a welding electrode, said aperture being of substantially greater cross-section than the welding electrode so as to provide a relatively loose fit therefor throughout the length of the aperture, one of said metal bars extending longitudinally beyond the other a predetermined distance, a hardened metal contact member positioned opposite the extending portion of said one bar, a relatively flat spring member having an intermediate portion extending along and spaced from the other of the bars and inturned end portions engaging the contact member and the other of the metal bars so as to position them in predetermined relation, and means comprising a clip positioned about the bars and spring member intermediate the ends thereof for urging the spring member to bias the contact member toward the said one metal bar.

8. A nozzle for guiding a welding electrode comprising, a pair of elongated metal bars having complementary longitudinal grooves defining an aperture to provide a passage larger than the electrode, one of said bars extending longitudinally beyond the other to provide an elongated contact surface, means securing the bars together adjacent the extending portion, a relatively flat hardened wear member engaging the electrode throughout substantially the length of the contact surface for biasing the electrode against the extending portion, a substantially U-shaped spring member connected at one end to the wear member and at the other end to the other of the bars, and means including a clip positioned about the bars and spring member operable to adjust the pressure between the wear member and the electrode.

COLBY W. STEWARD.